Patented Apr. 20, 1937

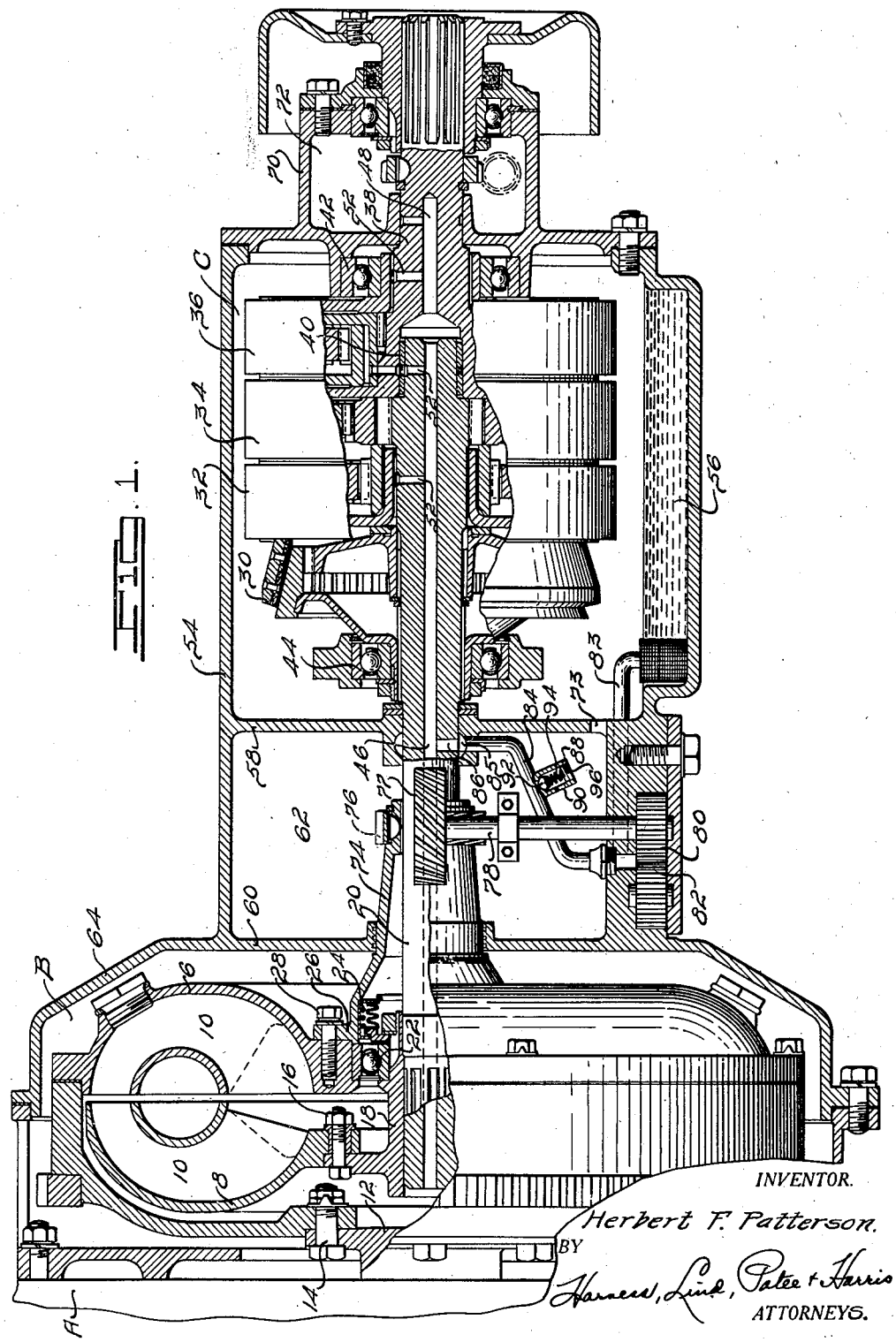

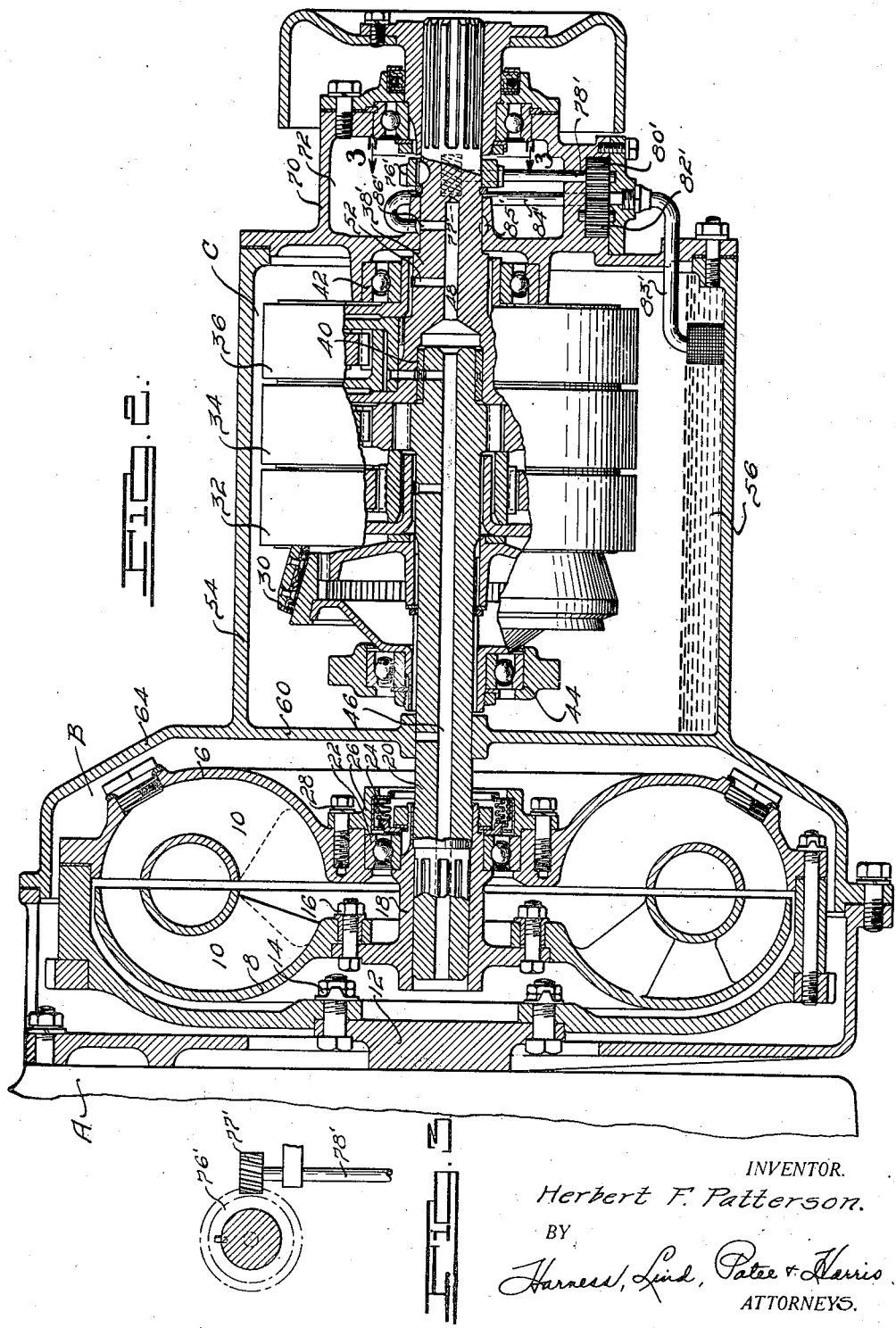

2,077,580

UNITED STATES PATENT OFFICE 2,077,580

POWER TRANSMITTING DEVICE

Herbert F. Patterson, Detroit, Mich., assignor to Chrysler Corporation, Detroit, Mich., a corporation of Delaware Application September 19, 1934, Serial No. 744,632

8 Claims. (Cl. 74—293)

This invention relates to power transmitting devices or mechanisms and refers more particularly to power transmitting mechanisms employing a fluid coupling in the line of drive, especially where the fluid coupling transmits the drive between a prime mover, such as an internal combustion engine, and a driven mechanism, such as a speed ratio changing device.

It is desirable, in employing fluid couplings, to provide for replenishing any fluid which may escape through leakage or from other causes, and one object of my invention is to provide improved means for supplying fluid to such couplings.

A further object of the invention is to provide means for supplying a fluid, preferably a lubricating oil under pressure, to a fluid coupling and also a mechanism driven therefrom, such as a speed ratio changing mechanism. I preferably provide such oil supply means as a common system.

Where my invention is used in connection with the drive for motor vehicles, wherein my invention has particular significance, I preferably employ a planetary type of speed ratio changing mechanism in connection with the fluid coupling since advantages of smooth gear changing and other benefits arising from such an arrangement are well known in the art. Other forms of speed ratio changing devices may be employed, however, if desired. In carrying out my invention, according to one embodiment thereof, I supply lubricating oil under pressure to the bearings and other parts of the speed ratio changing mechanism and such oil supply preferably includes a shaft driven by the fluid coupling and adapted to drive the speed ratio changing mechanism, such shaft providing a common passage or conduit in the fluid conducting system for the fluid coupling and the transmission.

Further objects of my invention are to provide improved means for supplying fluid to a fluid coupling in order to maintain an adequate supply of fluid in the coupling and to initially fill or partially fill the coupling to establish a drive for the vehicle or other mechanism driven thereby, the fluid lubricant being preferaby supplied under pressure derived from the prime mover or engine, but maintained separate from the engine lubricant whereby my lubricant is kept free from engine crank case dilutents such as carbon, water, gasoline, etc.

A further object of the invention, in the more limited aspects thereof, resides in the provision of means for salvaging any leakage which may escape from the fluid coupling. It is generally desirable to provide a bearing and sealing means therefor between the relative rotatable parts of a fluid coupling, and I have provided means for collecting any fluid which may escape from such a bearing or seal, the fluid thus collected being preferably returned to the fluid coupling or to the common system including the lubricating supply of the speed ratio changing mechanism and the supply of lubricating oil to the fluid coupling where such a combined system is employed.

Other objects and advantages of the invention will be more apparent from the following description taken in connection with the accompanying drawings illustrating several embodiments which my invention may assume and in which:

Fig. 1 is a side view, mostly in cross section through the fluid coupling and the speed ratio changing mechanism connected thereto, illustrating one embodiment of my invention.

Fig. 2 is a similar sectional view illustrating another embodiment of my invention.

Fig. 3 is a detail sectional view taken on the line 3—3 of Fig. 2.

Referring to the drawings, I have shown the rear portion of a prime mover or internal combustion engine A, a fluid coupling or clutch B and a driven mechanism such as a change speed ratio mechanism or gear box C. The coupling B is disposed intermediate the prime mover A and the gear box C and is adapted to drivingly connect the same. The coupling B includes a pair of oppositely disposed cup shaped members 6 and 8 having blades 10 together forming a purality of chambers or vane passages for a circulating fluid. The member 6 is secured to an engine drive shaft or crank shaft 12 by bolts 14 and serves as the driving member or impeller. The member 8 is fixed by bolts 16 to a hub 18, the latter being splined on a shaft 20 disposed in axial alignment with the shaft 12 and extending into the gear box C. A bearing 22 is disposed between the relatively rotatable member 6 of the coupling B and the hub 18 splined on the shaft 20 whereby to center the impeller on the driven shaft. A suitable spring pressed fluid seal 24 encircles the shaft 20 and acts against the bearing 22, the seal having an abutment provided by a retainer 26 fixed to the member 6 by bolts 28.

From the above arrangement of parts it will be understood that the energy imparted to the circulating fluid by rotation of the member 6, through the drive transmitted from the engine crank shaft 12, is utilized to drive the member 8 and the mechanism associated therewith.

The speed ratio change mechanism or gear box

C as illustrated is of the planetary gear type, this general form of mechanism being well known in the art and, as usual, includes a plurality of speed ratio controlling clutching or braking devices 30, 32, 34 and 36, these devices being adapted to control the actuation of the mechanism in its various speed ratios in conjunction with associated planetary gear trains through which the drive is selectively effected. From the shaft 20 the drive is transmitted through the various gearing, under selective control of the aforesaid braking devices, to a shaft 38 disposed in substantially axial alignment with the shaft 20 and extending beyond the gear box C for the power take off for driving the motor vehicle. The rearwardly extending end of the shaft 20 is received in and journaled by suitable bearings 40, in the forward end of the shaft 38, while the latter shaft is journaled in a bearing 42 adjacent the rear of the gear box C. The shaft 20 is provided with a bearing 44 intermediate its ends. Other arrangements of bearings may be employed according to requirements and types of speed ratio change mechanisms used.

Each of the shafts 20 and 38 is provided with a longitudinally or axially extending passage 46 and 48 respectively, with intercommunication therebetween, and through which a fluid lubricant is adapted to be transferred from a source of supply, hereinafter more fully described, to the coupling B where it is discharged into the coupling chamber. Each of the shafts is provided with radially extending passages 52, communicating with the aforesaid longitudinal or axial passages 46 and 48, through which lubricant is supplied to the bearing surfaces of the shafts and the various planetary gearing and bearings of the speed ratio changing mechanism for lubricating the same. By means of this system of intercommunicating passages a fluid lubricant from a common source is supplied to the gear box C for lubrication thereof and to the coupling B to provide the drive and to replenish any fluid escaping therefrom.

The gear box C is enclosed by a casing 54 in which is formed a reservoir 56 for the storage of lubricant to be supplied to the coupling B and gear box C. In the embodiment of my invention illustrated in Fig. 1, the casing 54 has an intermediate partition 58 and an end wall 60, between which is a compartment 62 within which the hereinafter described pumping mechanism is disposed. The casing 54 may be provided with an extended portion 64 connected forwardly to the engine A for housing the coupling B. The casing 54 is closed at the rear thereof by a casing member 70, the latter having a compartment 72 which serves to house the pumping mechanism illustrated in Fig. 2. Fluid in the compartment 62 is permitted to flow into the reservoir 56 through an opening 73 in the partition 58.

As illustrative of one means for supplying lubricant to the gear box C and coupling B, I have shown a pump of the conventional gear type. In Fig. 1, the driving member 6 of the coupling B has drivingly connected thereto a sleeve 74, integral with the aforesaid retainer 26. This sleeve carries a driving gear 76 meshing with a drive gear 77 on the upper end of a vertically disposed pump drive shaft 78, the lower end of the latter being provided with a pump gear 80 meshing with a pump idler gear 82. By this pumping mechanism, lubricant is drawn from the reservoir 56 by an intake pipe 83 and delivered continuously from the pump by means of piping 84 and annular passage 85 to the radial opening 86 in the shaft 20 and is forced through the longitudinal passage 46 of the shaft to the coupling B and gear box C. By operation of the mechanism illustrated in Fig. 1, lubricant is supplied continuously under pressure to the gear box C and the coupling B during operation of the prime mover or engine A. The coupling B, after initial filling, will receive additional lubricant only as required for replacing any fluid which may escape.

As illustrated in Fig. 1, fluid is supplied under pressure to the coupling B and gear box C at all times during operation of the prime mover A, even when the gear box is not operating to drive the vehicle. As a means for relieving excess pressure produced by operation of the pumping mechanism, I have provided a relief valve structure in the piping 84. This valve structure includes a housing 88 having an opening at one end thereof communicating with the supply piping 84 and a radial relief or fluid escape opening 90 communicating with the compartment 62. Within the housing 88 is a ball valve 92 which is adapted to control the opening between the piping 84 and the escape opening 90. This ball is yieldingly retained against its seat in the piping 84 by means of a tension spring 94 interposed between the ball and a nut 96, the latter being in screw threaded engagement with the housing 88 for adjusting the relief pressure. When the pressure within the mechanisms to which fluid is supplied becomes sufficient to overcome the tension of the spring 94, the ball 92 is forced off its seat and the fluid is permitted to flow through the opening 90 into the compartment 62, from which it may pass through the opening 73 in the partition 58 into the reservoir 56. When the pressure is relieved the ball is returned to its seat, closing the opening between the valve and piping. Any fluid which may escape from the circulating chamber of the coupling B through the bearing 22 and seal 24 may pass along the outer surface of the shaft 20 and into the compartment 62 and thence through the opening 73 in the partition 58 and into the reservoir 56. Also, the compartment 62 will collect any fluid which may escape rearwardly from the coupling B between the shaft 20 and hub 18.

Referring to Fig. 2, it will be seen that the means for supplying fluid from the reservoir to the gear box C and coupling B is generally similar to that illustrated in Fig. 1 as noted by the similar reference characters, but differs from the latter in that the pump mechanism is driven by the driven shaft 38′ and operates only during the working period of the gear box C when a drive is being transmitted therethrough to the vehicle. This pump mechanism includes the driving and driven pump gears 80′ and 82′, respectively, these gears being located in the compartment 72 which is disposed rearwardly of the rear box C instead of forwardly thereof as shown in Fig. 1. The pump driving gear 80′ is driven by a pump drive shaft 78′ carrying a gear 77′ meshing with a driving gear 76′, the latter in this instance being fixed to the transmission driven shaft 38′.

In Fig. 2 the pump is supplied with lubricant from the main reservoir 56 by an intake pipe 83′ and lubricant under pressure is delivered from the pump by a supply pipe 84′ to the annular passage 85′ for delivery through the radial passage 86′ to the axial passage 48. As stated heretofore, the axial passage 48 is in communication with the axial passage 46 of the shaft 20 so that lubricant is supplied under pressure to the parts of the gear box C and also to the coupling B in the manner generally stated in connection with the Fig. 1 embodiment.

What I claim is:

1. In a power transmitting mechanism having driving and driven means, a speed ratio changing mechanism intermediate said driving and driven means for changing the speed ratio therebetween, a fluid coupling drivingly connecting said driving means and said speed ratio changing mechanism, said coupling having a chamber adapted to receive a fluid for providing said drive, a reservoir for said fluid, means including a pump for supplying a fluid under pressure from said reservoir to said speed ratio changing mechanism for lubricating the same and to said fluid coupling chamber, and means for controlling the pressure in said fluid supply means.

2. In a power transmitting mechanism having driving and driven means, a speed ratio changing mechanism intermediate said driving and driven means for changing the speed ratio therebetween, a fluid coupling drivingly connecting said driving means and said speed ratio changing mechanism, said coupling having a chamber adapted to receive a fluid for providing said drive, and means operable by said driven means for supplying a common fluid to said speed ratio changing mechanism for lubricating the same and to said fluid coupling chamber.

3. In a power transmitting mechanism having driving and driven means, a speed ratio changing mechanism intermediate said driving and driven means for changing the speed ratio therebetween, a casing for said latter mechanism, said casing providing a fluid reservoir, a fluid coupling drivingly connecting said driving means and said speed ratio changing mechanism, said coupling having a chamber adapted to receive a fluid for providing said drive, a system of fluid conducting passages communicating with said fluid coupling chamber and with said speed ratio changing mechanism, and means including a pump disposed in said casing for supplying fluid under pressure from said reservoir through said passages to said speed ratio changing mechanism for lubricating the same and to said fluid coupling chamber.

4. In a power transmitting mechanism having driving and driven means, a speed ratio changing mechanism intermediate said driving and driven means for changing the speed ratio therebetween, a fluid coupling drivingly connecting said driving means and said speed ratio changing mechanism, said coupling having a chamber adapted to receive a fluid for providing said drive, a system of fluid conducting passages communicating with said fluid coupling chamber and with said speed ratio changing mechanism, and means operable by said driven means for supplying fluid through said passages to said speed ratio changing mechanism for lubricating the same and to said fluid coupling chamber.

5. In a power transmitting mechanism including driving and driven shafts, a speed ratio changing mechanism associated with said driven shaft, a fluid reservoir associated with said latter mechanism, a fluid coupling drivingly connecting said driving shaft and said speed ratio changing mechanism, said coupling having a chamber adapted to receive a fluid for providing said drive, means including axially and radially extending fluid conducting passages associated with at least one of said shafts and communicating with said chamber and with said speed ratio changing mechanism, respectively, said passages providing a one-way fluid course and means for supplying fluid from said reservoir through said passage means to said speed ratio changing mechanism for lubricating the same and to said fluid coupling chamber.

6. In a power transmitting mechanism including driving and driven shafts, a planetary type speed ratio changing mechanism intermediate said shafts for changing the speed ratio therebetween, a fluid coupling drivenly connected with said driving shaft, said coupling having a fluid receiving chamber adapted to provide a drive, a shaft intermediate said driving and driven shafts and adapted to drivingly connect said fluid coupling and said planetary speed ratio changing mechanism, a casing for said latter mechanism, said casing having spaced bearings for journaling said intermediate shaft and said driven shaft, respectively, a fluid reservoir in said casing, said intermediate and said driven shafts having a system of fluid conducting passages including an axially extending passage in communication with said fluid coupling and radially extending passages in communication with said speed ratio changing mechanism and said bearings, and pumping mechanism driven by one of said shafts for supplying fluid from said reservoir through the passages of said shafts for lubricating said speed ratio changing mechanism and said bearings and to said fluid coupling chamber for providing said drive.

7. In a power transmitting mechanism including driving and driven shafts, a speed ratio changing mechanism intermediate said shafts for changing the speed ratio therebetween, a fluid coupling drivenly connected with said driving shaft, said coupling having a fluid receiving chamber adapted to provide a drive, a shaft intermediate said driving and driven shafts and adapted to drivingly connect said fluid coupling and said speed ratio changing mechanism, said intermediate shaft and said driven shaft having fluid conducting passages communicating with said fluid coupling and said speed ratio changing mechanism, a casing for said latter mechanism, a fluid reservoir in said casing, and a pump driven by one of said shafts for supplying fluid from said reservoir through said passages to said speed ratio changing mechanism for lubricating the same and to said fluid coupling chamber.

8. In a power transmitting mechanism including driving and driven shafts, a speed ratio changing mechanism intermediate said shafts for changing the speed ratio therebetween, a fluid coupling drivingly connecting said driving shaft and said speed ratio changing mechanism, said coupling having a fluid circulating chamber for providing said drive, fluid conducting passages in communication with said fluid circulating chamber and said speed ratio changing mechanism, a reservoir for collecting fluid escaping from said circulating chamber, and means operably connected with said driven shaft for supplying said collected fluid to said speed ratio changing mechanism for lubricating the same.

HERBERT F. PATTERSON.